Figure 1:
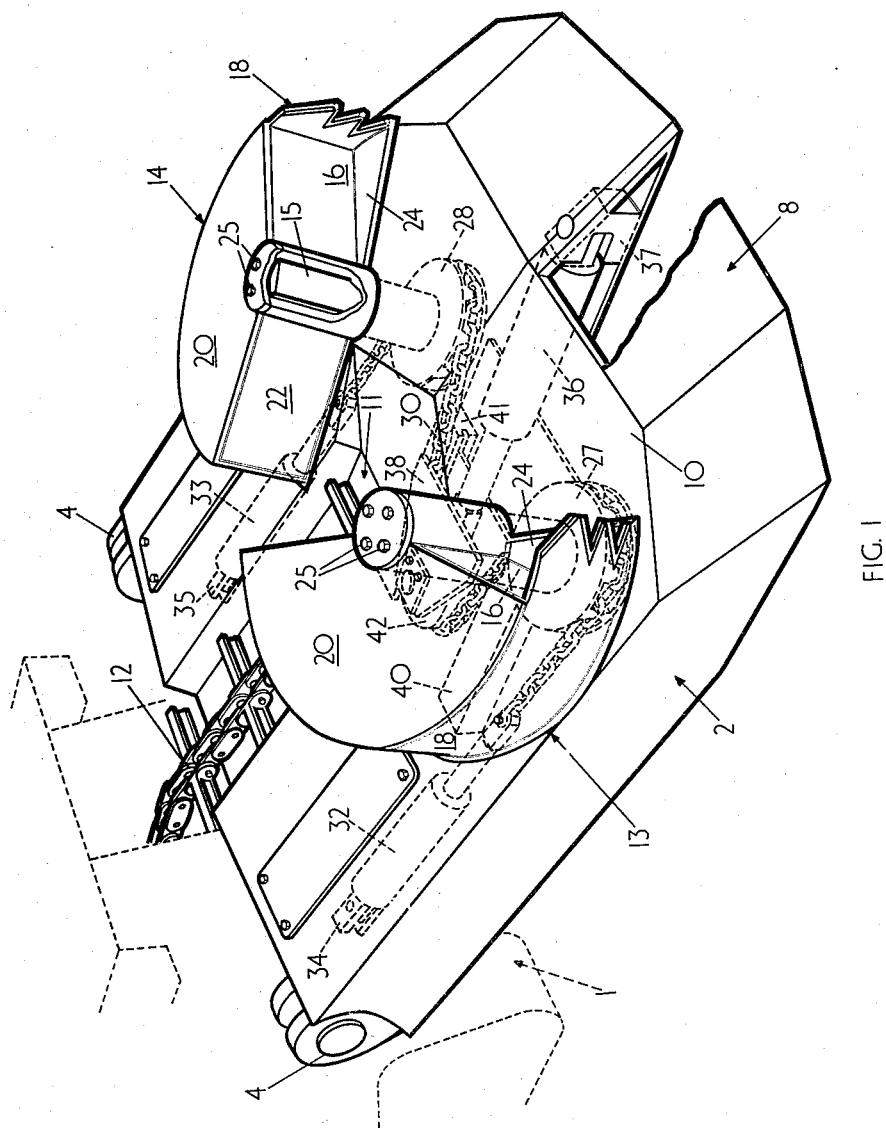

United States Patent [19]
Tothfalusi

[11] 4,228,890
[45] Oct. 21, 1980

[54] PARTICULATE MATERIAL LOADING EQUIPMENT

[75] Inventor: Miklos Tothfalusi, Burton-on-Trent, England

[73] Assignee: Coal Industry (Patents) Limited, London, England

[21] Appl. No.: 15,609

[22] Filed: Feb. 27, 1979

Related U.S. Application Data

[63] Continuation of Ser. No. 815,279, Jul. 13, 1977, abandoned.

[30] Foreign Application Priority Data

Jul. 13, 1976 [GB] United Kingdom ............... 29037/76

[51] Int. Cl.³ ............................................. B65G 65/02
[52] U.S. Cl. ..................................... 198/514; 198/736
[58] Field of Search ............... 198/512, 514, 515, 518, 198/520, 522, 621, 717, 736, 308; 299/18, 56, 64–67; 74/99 R; 414/525, 133

[56] References Cited

U.S. PATENT DOCUMENTS

| | | | |
|---|---|---|---|
| 2,639,023 | 5/1953 | Goodrich | 198/514 |
| 2,786,361 | 3/1957 | Russell | 74/99 R |
| 2,885,056 | 5/1959 | McElhattan | 198/514 |
| 3,174,425 | 3/1965 | Eby et al. | 198/514 |
| 4,047,762 | 9/1977 | Bamford et al. | 198/514 |

*Primary Examiner*—Joseph E. Valenza
*Attorney, Agent, or Firm*—Stevens, Davis, Miller & Mosher

[57] ABSTRACT

Loading equipment for particulate material comprising a working deck and angularly displaceable paddles mounted for repeated to and fro movement about pivotal axes along a portion of the working deck to urge the particulate material over the deck, each paddle being seen as a sector of a circle when viewed along the pivotal axis.

4 Claims, 2 Drawing Figures

PARTICULATE MATERIAL LOADING EQUIPMENT

This is a continuation of application Ser. No. 815,279, filed July 13, 1977, and now abandoned.

This invention relates to particulate material loading equipment and in particular, although not exclusively, to broken rock loading equipment comprising loading aprons which in use are adapted to be urged into piles of broken rock to be loaded.

It is known for such loading equipment to have gathering arms which repeatedly and continuously sweep over portions of the loading apron deck in order to urge broken rock on the deck towards a conveyor extending rearwardly from the loading apron. Unfortunately the drive mechanism for the gathering arms tends to be intricate and involves a high initial cost as well as a high level of maintenance.

An object of the present invention is to provide loading equipment which is efficient, robust, relatively inexpensive and simple to operate.

According to the present invention, particulate material loading equipment includes a working deck for receiving particulate material to be loaded and at least one driven paddle device for urging particulate material over at least a portion of the deck towards a discharge, the driven paddle device comprising an angularly displaceable paddle device mounted for repeated to and fro movement about a pivotal axis along the portion of the deck, and displacing means for angularly displacing the paddle device about the pivotal axis, the paddle device having a working face for urging the particulate material, the working face extending from adjacent to the pivotal axis of the paddle device towards a radially more remote peripheral face of the paddle which, in use when the paddle device moves in a material urging direction, substantially extends along the full length of the path defined by the radially outer portion of the working face of the paddle device throughout angular displacement of the paddle device.

Preferably, the paddle device is seen as a sector of a circle looking along the pivotal axis.

Advantageously, the displacing means comprises a drive shaft passing through the working deck, the shaft being drivably connected to the paddle device.

Preferably, a chain sprocket is drivably connected to a portion of the shaft below the deck, the sprocket being rotated to and fro by the action of ram means on a chain drivably engaging the sprocket.

Advantageously, two similar but opposed paddle devices are mounted on the deck.

Conveniently, both the paddle devices have drive shafts provided with chain sprockets drivably engageable by a common chain and the ram means comprises two rams attached to the ends of the chain, respectively, for urging the paddles in a non-conveying direction and a further ram engaging the chain intermediate the two sprockets for urging the paddle devices in a conveying direction.

Conveniently, control means for the ram means are provided such that both the paddle devices are actuated simultaneously to urge particulate material towards a central discharge.

Advantageously, the discharge includes conveyor means.

The control means may control the ram means such that the paddle devices are actuated separately.

The present invention also provides a mining machine including loading equipment as defined above.

Figure 2:
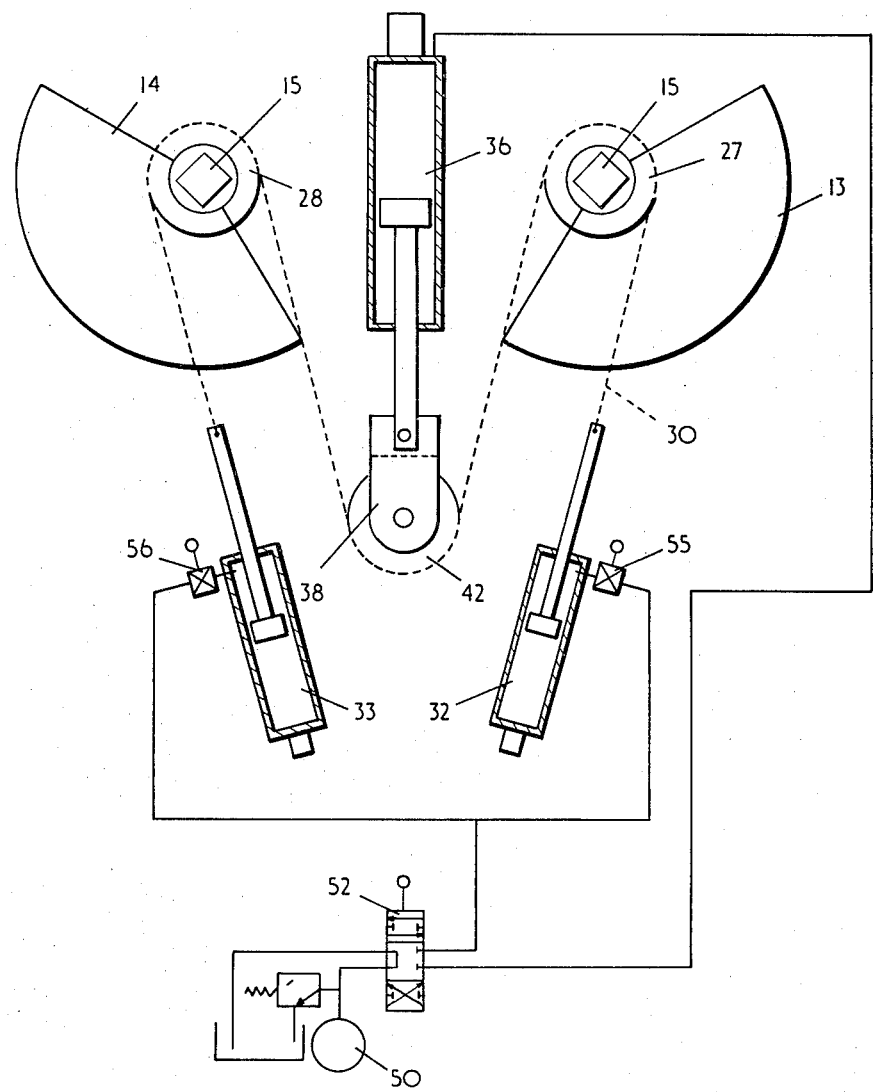

By way of example only, one embodiment of the present invention will be described with reference to the accompanying drawings in which:

FIG. 1 is a perspective view of broken rock loading equipment constructed in accordance with the present invention and mounted on a mining machine; and FIG. 2 is a circuit diagram for the loading equipment of FIG. 1.

FIG. 1 shows loading equipment constructed in accordance with the present invention mounted on a track mounted mining machine 1 (only parts of the outline of which are shown). The loading equipment comprises a downwardly inclined loading apron 2 having pivotal supports 4 for attachment to leading portions of the mining machine and a hollow working deck assembly, the leading margin 8 of which is tapered enabling the apron in use to be urged into the bottom of a pile of broken rock to be loaded. The loading apron has an upper working deck 10 having a central cut out discharge 11 accommodating a scraper chain conveyor 12 for conveying broken rock from the loading apron rearwardly towards further conveyor means (not shown).

Broken rock falling from the pile onto the working deck is urged towards the conveyor 12 by a driven paddle device comprising two similar, but opposed, angularly displaceable paddles 13 and 14 mounted for repeated to and fro movement about pivotal axes coincident with the axes of two driven shafts 15 (only one of which is shown in FIG. 1). Each paddle 13 and 14 is generally shaped as a quadrant looking along the pivot axis of the paddle and having an upright working face 16 for urging broken rock which extends radially from adjacent to the pivotal axis of the paddle towards a radially more remote curved peripheral face 18 which substantially extends along the full length of the path defined by the radially outer portion of the working face 16 throughout the angular displacement of the paddle. The peripheral face 18, thereby, prevents broken rock debris being urged in the non-conveying direction by the rear surface of the working face 16. The upper face of each paddle is closed by a plate or cover 20 shaped as a sector of a circle and the rear face is closed by an upright plate 22. A toe plate 24 is provided in front of the working face 16, the curved peripheral face 18 projecting forward beyond the working face towards the leading margin of the toe plate. As seen in FIG. 1, the leading margin of the curved peripheral face 18 has cut outs to help guide the paddle into the pile of broken rock on the working deck.

Each paddle 13 or 14 is drivably mounted on a substantially square-section uppermost of the associated drive shaft 15, the paddle being retained on the shaft by bolts 25 engaged in threaded holes formed in the end of the drive shaft. Each drive shaft 15 extends through the working deck 10 and is rotatably mounted in bearings (not shown) provided on the deck assembly. The lowermost portion of each drive shaft is substantially square-sectioned and is drivably engaged by a similarly sectioned bore of a chain sprocket 27 or 28. Thus, rotation of the chain sprockets 27, 28 results in angular displacement of the paddles 13, 14 respectively. The chain sprockets 27, 28 are drivably engaged by a common chain 30, movement of which is controlled by ram means comprising two single acting rams 32, 33 secured between the ends of the chain and to brackets 34, 35, respectively, fixedly secured to the deck assembly. The ram means also comprises a central single acting ram 36 secured between a bracket 37 fixedly secured to a leading portion of the deck assembly and a slide bracket 38 slidably mounted in two parallel guides 40, 41 of a guideway. The slide bracket 38 is provided with a curved chain guide or chain bollard 42 which engages the chain 30 intermediate the two sprockets 27, 28 such that in operation as the ram 32 and 33, and 36 are alternatively actuated to move the slide bracket 38 to and fro along the guideway the two halves of the chain are urged to rotate the sprockets 27, 28. Consequently, the paddles are moved to and fro. As the central ram extends to move the paddles in the loading direction the two rams 32, 33 simultaneously act to maintain the chain tension substantially constant throughout operation of the central ram. In practice, internal friction in the rams may be sufficient to maintain the chain taut.

FIG. 2 shows the circuit diagram for the loading equipment of FIG. 1.

Pressure fluid is supplied by a pump 50 to a manually controlled three way hydraulic valve 52. In FIG. 2 the valve is shown in its neutral position feeding pressure fluid back to tank. The valve 52 can be actuated to feed pressure fluid either to the central ram 36 or alternatively to the rams 32 and 33, the other rams 32 and 33 or 36 simultaneously being connected to exhaust. Thus, if the valve 52 is actuated to feed pressure fluid to ram 36 the slide member 38 is urged by the ram 36 along the guideway to rotate both chain sprockets together with the drive shafts and paddles to urge broken rock towards the central discharge. As stated previously, the portions of the chain adjacent to the rams 32 and 33 are kept taut due to the internal friction of the rams. When the paddles have moved fully in the conveying direction the operator actuates the valve 52 to feed pressure fluid to the rams 32 and 33 and to connect the ram 36 to exhaust. Thus, the rams 32 and 33 move the chain sprockets, drive shafts and paddles in the non-conveying direction ready for more broken rock debris to fall on the portion of the working deck swept by the paddles. Thus, by repeated actuation of the valve 52 the paddles can be continuously moved to and fro to urge broken rock debris towards the discharge and, thereby, onto the conveyor which conveys the debris rearwards towards the mining machine.

If it is desired to actuate the paddles non-simultaneously associated manual valves 55 and 56 are suitably actuated to prevent feed of pressure fluid to the rams 32 and 33, respectively. Thus, actuation of the ram 36 displaces the piston of only one ram 32 or 33. Consequently, it is possible to actuate only one paddle or to actuate the two paddles in turn.

In other embodiments of the invention, the control means is provided with sensing means enabling the operation of the loading device to be automatic.

In other embodiments of the invention, the chain drive is dispensed with and each of the paddles 14 is driven repeatedly to and fro by the associated ram 32 or 33 acting through a lever extending transverse to the pivotal axis of the driven shaft 15, respectively, the lever being drivably attached to paddle.

In still other embodiments of the invention more than two paddles are provided on the loading equipment and in which case the paddle devices provided on each side of the loading equipment are arranged to feed material successively from one paddle to the next paddle.

I claim:

1. A mining machine comprising a forwardly and downwardly inclined loading apron pivotally mounted at the front of the machine and a discharge conveyor extending from the loading apron towards the rear of the machine, the loading apron including a working deck for receiving particulate material to be loaded by the machine and a tapered leading margin for urging particulate material from a pile of particulate material towards the working deck, the loading apron having at least one driven paddle device for urging particulate material over at least a portion of the working deck towards the discharge conveyor, the driven paddle device comprising an angularly displaceable paddle mounted for repeated to and fro movement about a fixed pivotal axis along the portion of the working deck, and displacing means including hydraulic ram means for angularly displacing the paddle device about the fixed pivotal axis, the paddle device being shaped as a sector of a circle and having a working face for urging the particulate material, the working face extending from adjacent to the fixed pivotal axis of the paddle device towards a radially more remote peripheral face of the paddle device which, in use when the paddle device moves in a material urging direction, substantially extends along the full length of the path defined by the radially outer portion of the working face of the paddle device throughout angular displacement of the paddle device and a rear face which, when the working face of the paddle is not urging the particulate material, acts to guide particulate material onto the conveyor.

2. The machine of claim 1 in which there are two said paddles, the fixed pivotal axes thereof being spaced apart in approximately the same plane, the distance between said axes being about twice the length of the working face so that both paddle devices can be moved simultaneously in the conveying direction.

3. The machine of claim 1 in which the upper face of the paddle is closed by an arcuate shaped plate co-planar with the upper edge of the working face.

4. A mining machine comprising a forwardly and downwardly inclined loading apron pivotally mounted at the front of the machine and a discharge conveyor extending from the loading apron towards the rear of the machine, the loading apron including a working deck for receiving particulate material to be loaded by the machine and a tapered leading margin for urging particulate material from a pile of particulate material towards the working deck, the loading apron having at least two driven paddle devices for urging particulate material over at least a portion of the working deck towards the discharge conveyor, the driven paddle devices comprising angularly displaceable paddles each mounted for repeated to and fro movement about a fixed pivotal axis along the portion of the working deck, and displacing means including hydraulic ram means for angularly displacing the paddle devices about their fixed pivotal axes, the displacing means comprising a chain sprocket on each paddle and a conveyor chain engaging said sprokets, first and second rams attached to the ends of said chain, a third ram engaging the chain intermediate the chain sprockets and control means to selectively actuate said rams to move said chain and consequently move said paddle devices in a conveying and non-conveying direction.

* * * * *